Patented Feb. 26, 1929.

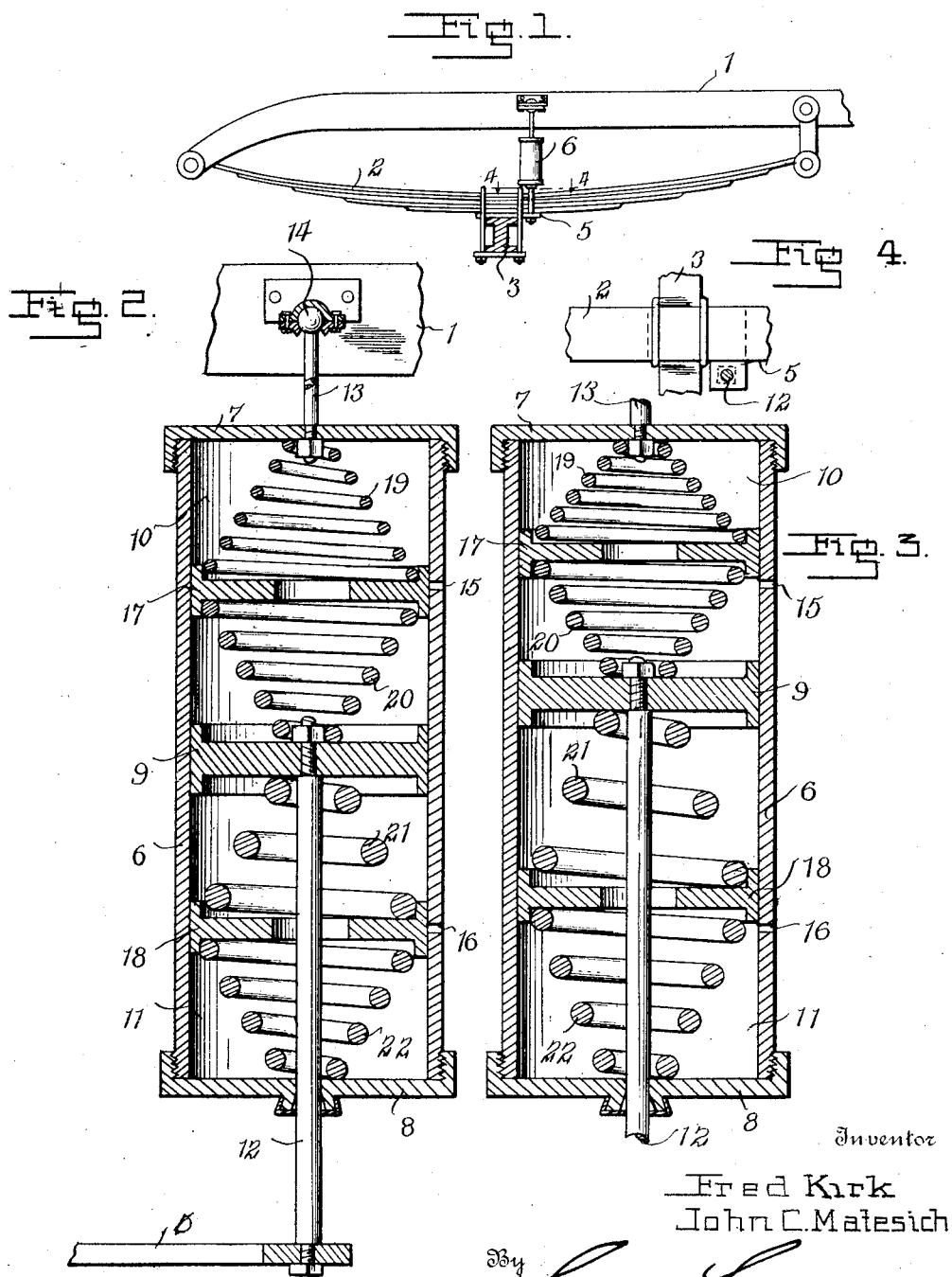

1,703,397

UNITED STATES PATENT OFFICE.

FRED KIRK AND JOHN C. MATESICH, OF ZANESVILLE, OHIO, ASSIGNORS OF ONE-HALF TO SAID MATESICH AND ONE-HALF TO JESSIE B. KIRK, OF ZANESVILLE, OHIO.

SHOCK ABSORBER.

Application filed February 6, 1928. Serial No. 252,239.

This invention provides a device capable of functioning both as a neutralizer for shock and vibration and as a snubber to control the recoil and obviate the rebound and the usual unpleasant sensation incident thereto.

The invention contemplates a structure which admits of utilizing the combined cushioning effect of springs and air for absorbing shock incident to the use of vehicles generally and automoboiles in particular.

In the practical embodiment of the invention a cylinder or barrel is provided and a piston is arranged to operate therein and normally occupy a medial position to form end chambers. An opening is formed in a side wall of each chamber at an intermediate point and is controlled by a valve to regulate the admission and the exit of air. Each of the valves is disposed between a pair of open helical springs, preferably of volute formation and of different strength or tension. A pair of springs, with a valve therebetween, is located in each of the chambers. The piston is located between the pairs of springs which exert a pressure thereon in opposition to each other for positive cushioning action in each direction.

While the drawing illustrates a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which, Figure 1 is a side view of a vehicle spring and part of a frame bar of a vehicle provided with a shock absorber embodying the invention, the axle being in section.

Figure 2 is a central, longitudinal sectional view of the shock absorber showing the parts on a larger scale, and in normal position.

Figure 3 is a view similar to Figure 2 showing the piston and valves in an adjusted position and the air openings uncovered.

Figure 4 is an enlarged detail sectional view on the line 4—4 of Figure 1.

Corresponding and like parts are referred to in the following description and designated in the several views of the drawing by like reference characters.

The numeral 1 denotes part of the side bar of the frame or chassis of a vehicle, 2 a side spring and 3 an axle. A bracket 5 is clamped to the axle 3 and provides convenient means for attachment of the shock absorber thereto. These parts may be of any determinate construction and are illustrated simply to demonstrate the application of the invention.

The shock absorber comprises a cylinder or barrel 6 which is closed at opposite ends preferably by means of caps 7 and 8 which, for convenience, are threaded thereto. A piston 9 within the cylinder 6 divides the latter into chambers 10 and 11. The parts are of such construction and arrangement as to insure the piston 9 normally occupying a medial position within the cylinder, as indicated most clearly in Figure 2 of the drawings. A rod 12 connected to the piston 9 passes through an opening formed centrally of the cap 8 and is connected to the bracket 5. A rod 13 is connected to the cap 7, and extends upwardly and is coupled to the frame bar 1 by means of a ball and socket joint 14, whereby provision is had for a pivotal movement of the shock absorber to adapt itself to the various movements of the axle, or parts between which the device is interposed.

Openings 15 and 16 are formed in the side walls of the respective chambers 10 and 11 and provide for ingress and egress of air. A valve 17 disposed within the chamber 10 controls the opening 15. A similar valve 18 arranged within the chamber 11 controls the opening 16. Under normal conditions the valves 17 and 18 close the respective openings 15 and 16, and are adapted to be moved by the action of the cylinder and piston. Open helical springs 19 and 20 are located within the chamber 10 upon opposite sides of the valve 17. The spring 20 is approximately of greater strength and tension than the spring 19, hence in practice, the spring 19 yields more readily to pressure than the spring 20. Open helical springs 21 and 22 are disposed within the chamber 11 upon opposite sides of the valve 18. The spring 22 is relatively weaker than the spring 21 so as to yield more readily to pressure. The springs 19 and 20 constitute one pair which is located at one side of the piston 9. The springs 21 and 22 constitutes a second pair which is located upon the opposite side of the piston 9. These pairs of springs exert a pressure against opposite sides of the piston 9. The several springs are preferably of volute formation to admit of the coils nesting under pressure, whereby provision is had for a maximum throw or movement of the parts and the utilization of a cylinder or barrel of minimum length.

In the preferable construction the valves 17 and 18 are of like formation, each consisting of a dask having flanges projecting from opposite sides to obtain an extended bearing against the inner walls of the cylinder or barrel to prevent binding action. These offstanding flanges also engage the base coils of the several springs which are centered thereby. The small ends of the springs engage the respective rods, as clearly indicated in the drawings and are centered thereby. The small ends of of the springs engage the respective rods, as clearly indicated in the drawings and are centered thereby. Openings are formed in the disk or body portion of the valve to afford ready passage of the air from one side of a valve to the other.

Assuming that the parts are in normal position, substantially as shown in Figure 2 of the drawings a downward movement of the frame bar 1 will effect a like movement of the cylinder or barrel 6. The initial movement compresses the springs 19 and 20 and the air confined in the chamber 10. The spring 19 being of less strength than the spring 20 yields more readily and in consequence, the cylinder moves downwardly more rapidly than the valve 17 moves upwardly, and during the initial downward movement of the cylinder, it is resisted by the combined cushioning action of the springs 19 and 20 and the air confined in the chamber 10. When the cylinder reaches a certain point in its downward movement the opening 15 is uncovered, thereby providing an escape for the compressed air and for the further escape of air during the continued downward movement of the cylinder. Upon the return movement of the cylinder it is resisted by the action of the springs 21 and 22 and by the air confined in the chamber 11 after the valve 18 closes the opening 16. It will thus be understood that the pair of springs 21 and 22 neutralize the shock incident to the rebound or recoil. When the springs 19 and 20 are compressed by the relative downward movement of the cylinder 6 the springs 21 and 22 expand, but the expansion of the spring 22 is greater than the expansion of the spring 21 because of the superior strength or tension of the spring 21, as hereinbefore indicated.

The arrangement herein disclosed admits of a maximum movement of the parts and the use of a cylinder or barrel of minimum length. The pairs of springs upon opposite sides of the piston exert a differential pressure thereon, and the springs of each pair being of different strength exert a differential pressure upon the respective valves, hence the springs do not receive a uniform movement when subjected to pressure or when permitted to expand when relieved of pressure due to the relative movement of the piston and cylinder.

Having thus described the invention, we claim:

1. A shock absorber including a cylinder having a lateral opening for the ingress and egress of air, a piston within the cylinder, a valve movable axially of the cylinder and adapted to control the lateral opening thereof, and helical springs between the said valve and the end of the cylinder and the piston and adapted to effect a movement of the valve with the piston for covering and uncovering the said lateral opening.

2. A shock absorber comprising a cylinder having a lateral opening for the ingress and egress of air, a piston within the cylinder, a valve for closing the lateral opening and springs at the sides of the valve and between it and the piston and end of the cylinder.

3. A shock absorber comprising a cylinder having a lateral opening, a piston therein, a valve for closing the lateral opening, and springs of different strength disposed at opposite sides of the valve and between it and the piston and end of the cylinder.

4. A shock absorber comprising a cylinder having lateral openings adjacent each end, a piston dividing the cylinder into chambers, a valve in each of the chambers and closing the lateral openings leading outwardly therefrom, and a pair of springs in each chamber between the piston and the respective ends of the cylinder, the springs of each of the pairs having a valve disposed therebetween.

5. A shock absorber comprising a cylinder closed at opposite ends and provided in a side adjacent its ends with lateral openings, a piston dividing the cylinder into chambers, valves in the chambers and closing the lateral openings thereof and volute springs of different strength at opposite sides of the respective valves and between said valves and the piston and ends of the cylinder.

In testimony whereof we affix our signatures.

FRED KIRK. [L. S.]
JOHN C. MATESICH. [L. S.]